United States Patent
Riemers

(10) Patent No.: US 8,127,020 B2
(45) Date of Patent: Feb. 28, 2012

(54) HTTP STANDBY CONNECTION

(75) Inventor: Bill C. Riemers, Stoney Creek (CA)

(73) Assignee: Red Hat, Inc., Raleigh, NC (US)

( * ) Notice: Subject to any disclaimer, the term of this patent is extended or adjusted under 35 U.S.C. 154(b) by 260 days.

(21) Appl. No.: 12/200,768

(22) Filed: Aug. 28, 2008

(65) Prior Publication Data

US 2010/0057918 A1    Mar. 4, 2010

(51) Int. Cl.
G06F 15/16 (2006.01)

(52) U.S. Cl. .................. 709/227; 709/228; 709/203

(58) Field of Classification Search .............. 709/203, 709/227–228
See application file for complete search history.

(56) References Cited

U.S. PATENT DOCUMENTS

| | | | | |
|---|---|---|---|---|
| 6,789,119 B1* | 9/2004 | Zhu et al. | | 709/227 |
| 6,850,982 B1* | 2/2005 | Siegel | | 709/227 |
| 7,188,178 B2* | 3/2007 | Elonen et al. | | 709/227 |
| 7,644,172 B2* | 1/2010 | Stewart et al. | | 709/231 |
| 2002/0156901 A1* | 10/2002 | Erickson et al. | | 709/227 |
| 2003/0061355 A1* | 3/2003 | Yang et al. | | 709/227 |
| 2003/0097448 A1* | 5/2003 | Menezes et al. | | 709/227 |
| 2005/0273592 A1* | 12/2005 | Pryor et al. | | 713/150 |
| 2006/0095573 A1* | 5/2006 | Carle et al. | | 709/227 |
| 2007/0061469 A1* | 3/2007 | Rhim et al. | | 709/227 |
| 2007/0067496 A1* | 3/2007 | Deiretsbacher et al. | | 709/248 |
| 2007/0208802 A1* | 9/2007 | Barman et al. | | 709/203 |
| 2008/0022005 A1* | 1/2008 | Wu et al. | | 709/231 |
| 2010/0332594 A1* | 12/2010 | Sundarrajan et al. | | 709/203 |

OTHER PUBLICATIONS

Yann LeCun, Overview of the DjVu Document Compression Technology, AT&T Labs Research, Middletown, NJ, Apr. 2001 pp. 119-122 (4 pages).

* cited by examiner

Primary Examiner — Abdullahi Salad
(74) Attorney, Agent, or Firm — Lowenstein Sandler PC

(57) ABSTRACT

An apparatus and a method for requesting data from a server. In one embodiment, a client opens a first HTTP connection and a second HTTP connection with the server. The client requests for data from a random access file from the server with the first HTTP connection. The client receives and reads the data while maintaining the second HTTP connection open. The client requests for additional data at another location in the file on the second HTTP connection. The client maintains the second HTTP connection by occasionally sending requests to the server on the second HTTP connection.

15 Claims, 5 Drawing Sheets

HTTP STANDBY CONNECTION

TECHNICAL FIELD

Embodiments of the present invention relate to computing systems, and more particularly, to requesting data via HTTP from a server.

BACKGROUND

Many video formats such as AVI require random access in files in order to play videos. Unfortunately, there are no abort operation once a request for data from a HTTP server is placed. There are several ways to overcome the lack of abort operation from a HTTP server. In one method, the amount of data to be requested each time is already exactly known. In another method, the entire file is cached. In another method, a new HTTP connection is opened. However, all these operations are fairly slow.

As such, a need exists for an efficient and faster technique to perform a seek request from a HTTP server.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for requesting data from a server. In one embodiment, a client opens a first HTTP connection and a second HTTP connection with the server. The client requests for data of a random access file from the server with the first HTTP connection. The client receives and reads the portion of the random access file while maintaining the second HTTP connection open. The client requests for additional data at another location in the file on the second HTTP connection. The client maintains the second HTTP connection by occasionally sending requests to the server on the second HTTP connection.

Figure 1:
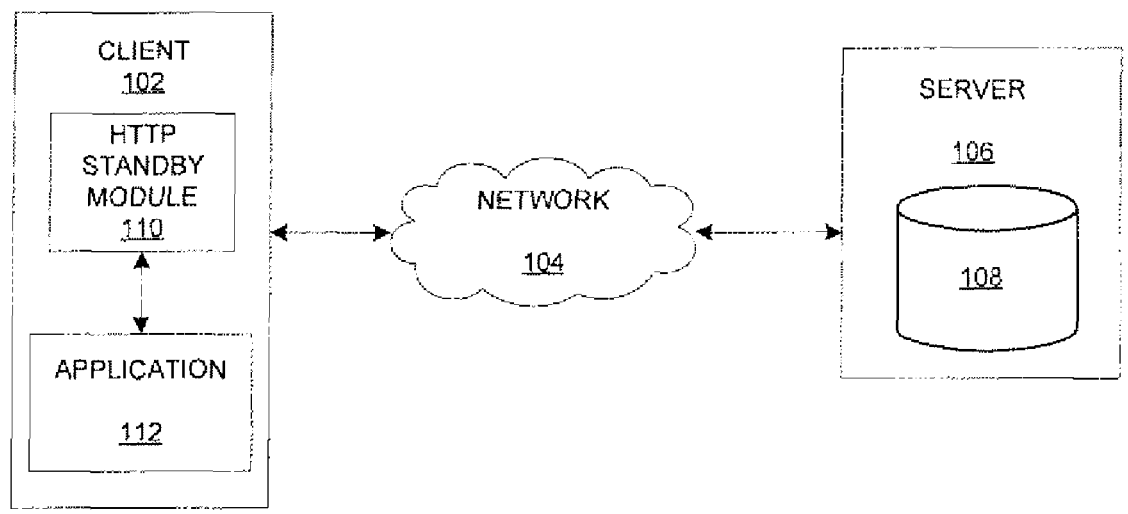
FIG. 1 is a block diagram illustrating one embodiment of a system for requesting data from a server over a HTTP connection.

FIG. 1 is a block diagram illustrating one embodiment of a system for requesting data from a HTTP server. A client 102 accesses data from storage 108 of server 106 via a computer network 104 such as the Internet. The data being accesses may require a random access in a file. For example, the data may include a video having a video format such as AVI which requires random access in the file in order to play videos.

Client 102 includes an application 112 configured to access the data. For example, application 112 may include a media player. Unfortunately, once a request for the data to the server is placed, HTTP specifies no abort operation. In one embodiment, this can be overcome by opening and maintaining a second HTTP connection in advance with the same server to be used to make the second request right away. Another way is to read a small amount of data and make the next request on the same connection. One way to accomplish this is to make each request for only a small block of data. When that data is consumed, the client requests the next block of data. If it is desired to seek within the data already requested, the client just reads to the start of that data. If it is desired to seek beyond the data requested, then the client simply read to the end of the current request and make the next request at the location desired.

Figure 2:
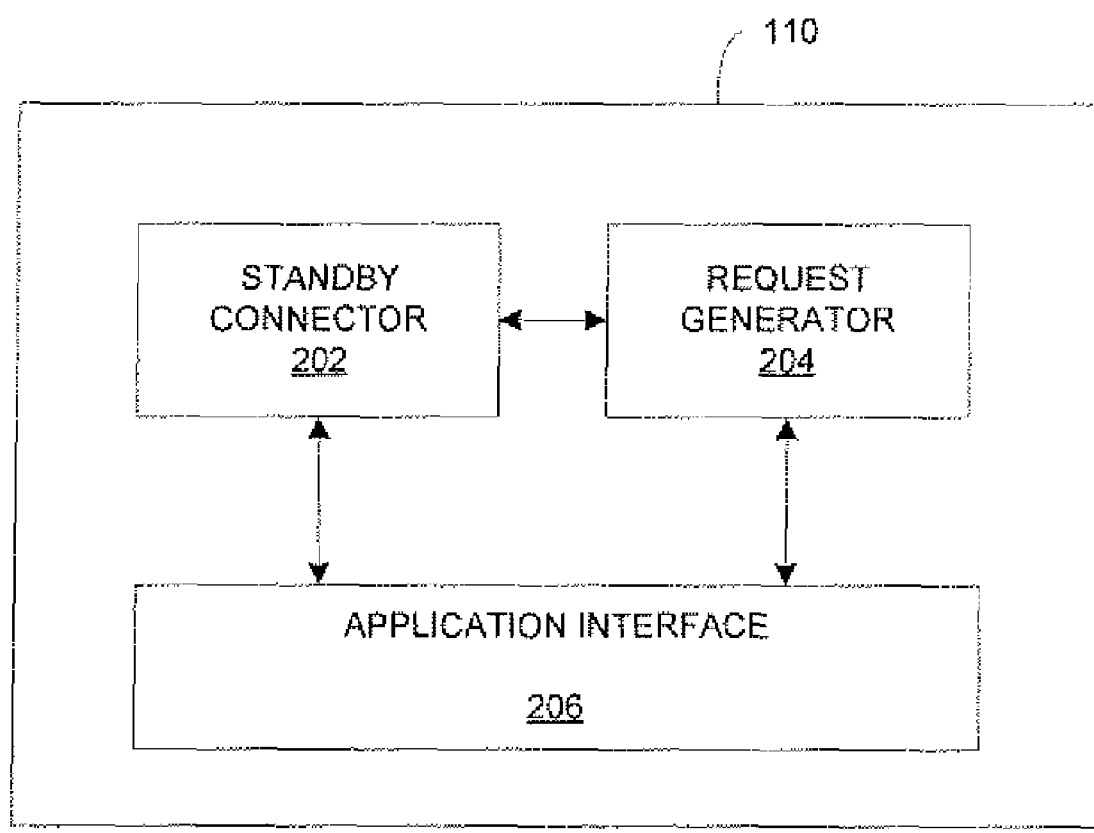
FIG. 2 is a block diagram illustrating one embodiment of a HTTP seeking module.

FIG. 2 is a block diagram illustrating one embodiment of a HTTP seeking module 110. HTTP seeking module 110 includes a standby connector 202, a request generator 204, an application interface 206. The standby connector 202 is configured to open and maintain a second HTTP connection to the same server while the client communicates with the server on the first HTTP connection. In one embodiment, the second HTTP connection can be maintained by occasionally sending requests to the server. These requests can include requests for cache status, or any other requests that may not be necessarily relevant to the sought data.

Figure 3:
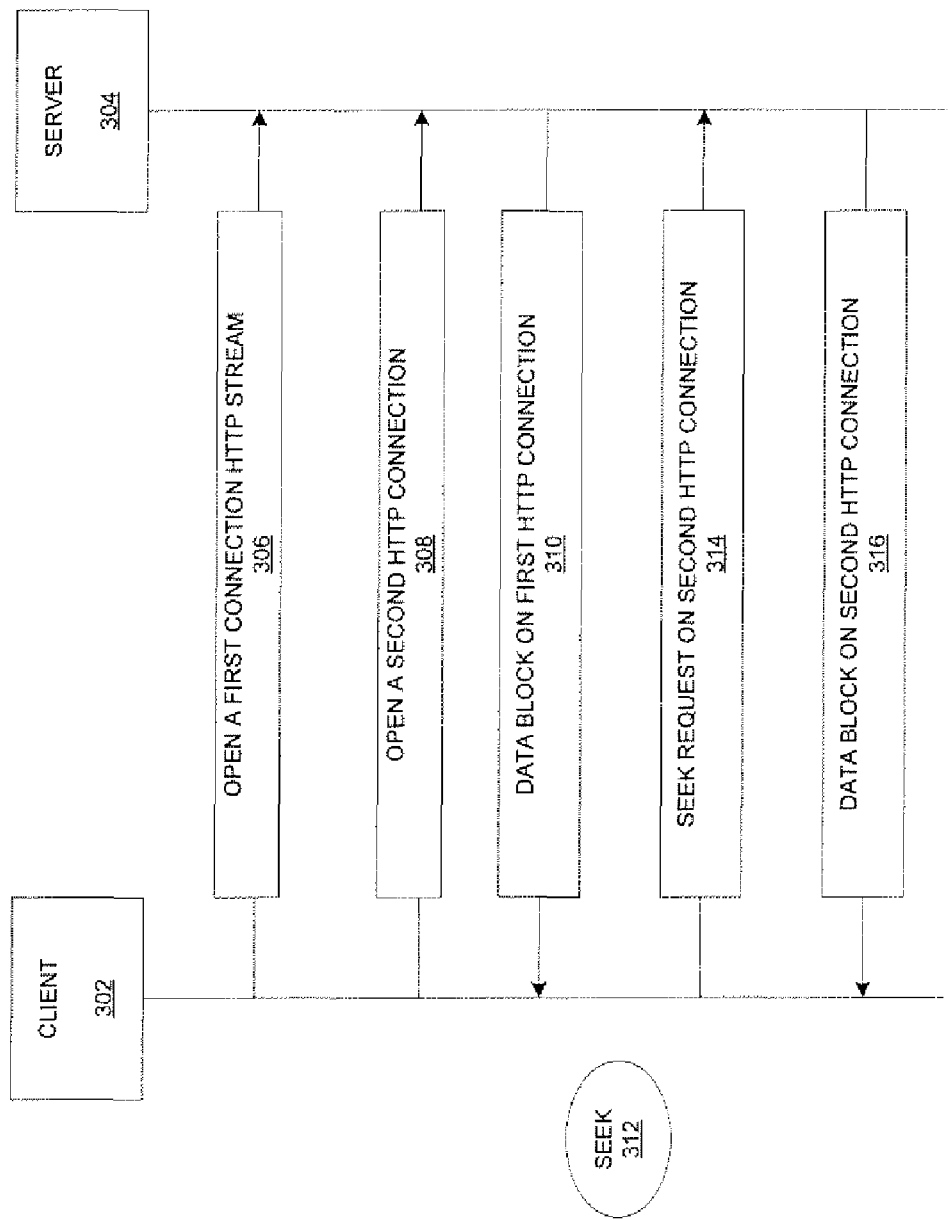
FIG. 3 is a ladder diagram illustrating one embodiment of a communication between a client and a server over a HTTP connection.

FIG. 3 is a ladder diagram illustrating one embodiment of a communication between a client 302 and a server 304. Client 302 opens a first HTTP connection 306 with server 304 to access data from server 304. Client 302 also opens a second HTTP connection 308 with server 304. In one embodiment, the data includes files that require random access to different parts of the files, such as audio and/or video files.

In one embodiment, client 302 reads data on the first HTTP connection 310 while maintaining the second HTTP connection open. Client 302 then performs a seek request in the file at 312. That seek request 312 is communicated over the second HTTP connection 314 prior to the client 302 completing the read on the first HTTP connection 310.

Client 302 may either close the first HTTP connection or continue reading data on that first connection. Server 304 generates a response and sends the data in response to the seek over the second HTTP connection at 316. Client 302 then opens another standby connection to handle additional seek requests.

Figure 4:
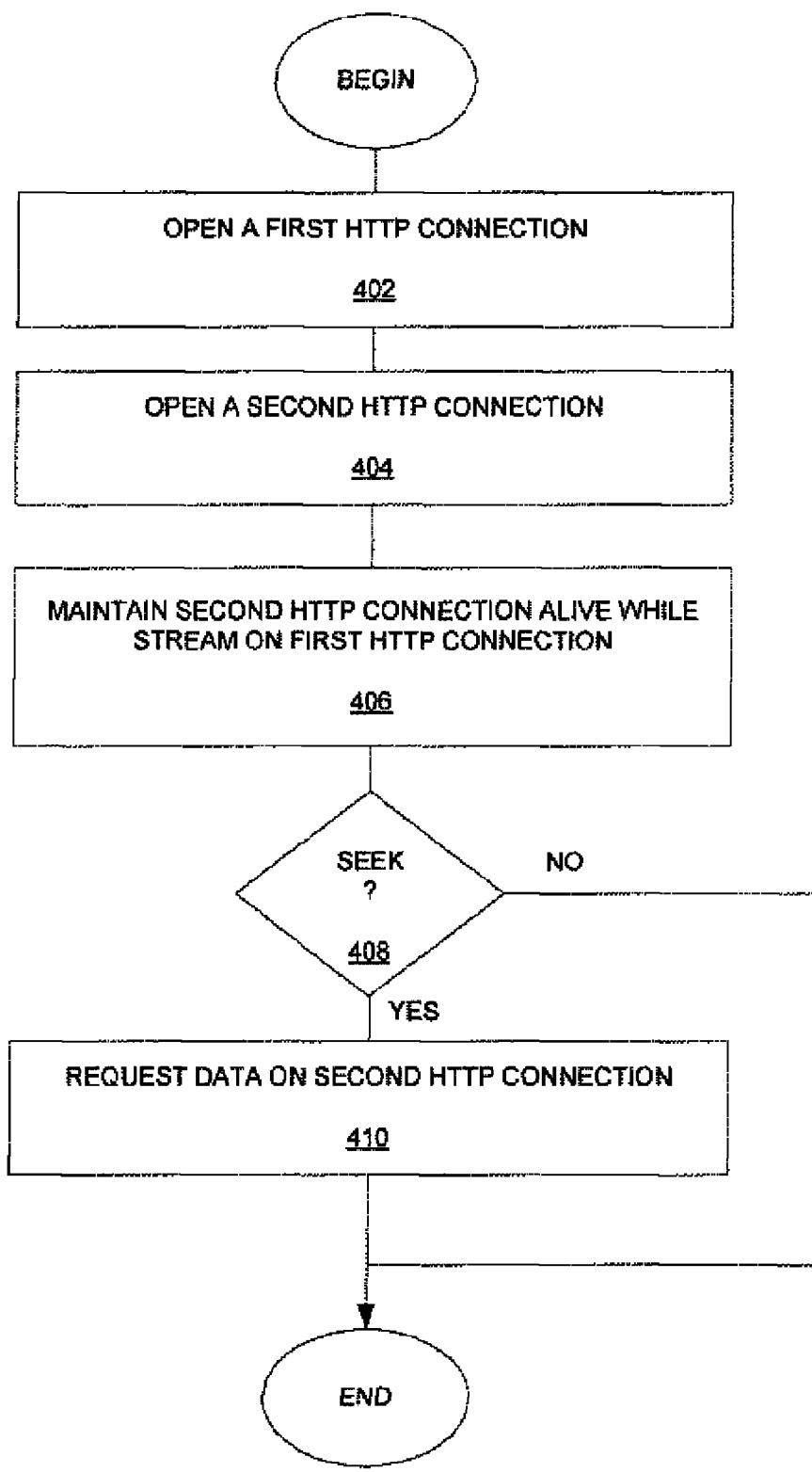
FIG. 4 is a flow diagram illustrating one embodiment of a method for requesting data from a server over a HTTP connection.

FIG. 4 is a flow diagram illustrating one embodiment of a method for requesting data from a server. At 402, a client opens a first HTTP connection with a server. At 404, the client opens a second HTTP connection with the server. At 406, the client maintains the second HTTP connection alive while the client streams data from the first HTTP connection.

At 408, the client determines whether a seek operation is requested. If a seek operation is requested, the request is sent over the second HTTP connection prior to the client finish reading data on the first HTTP connection.

Figure 5:
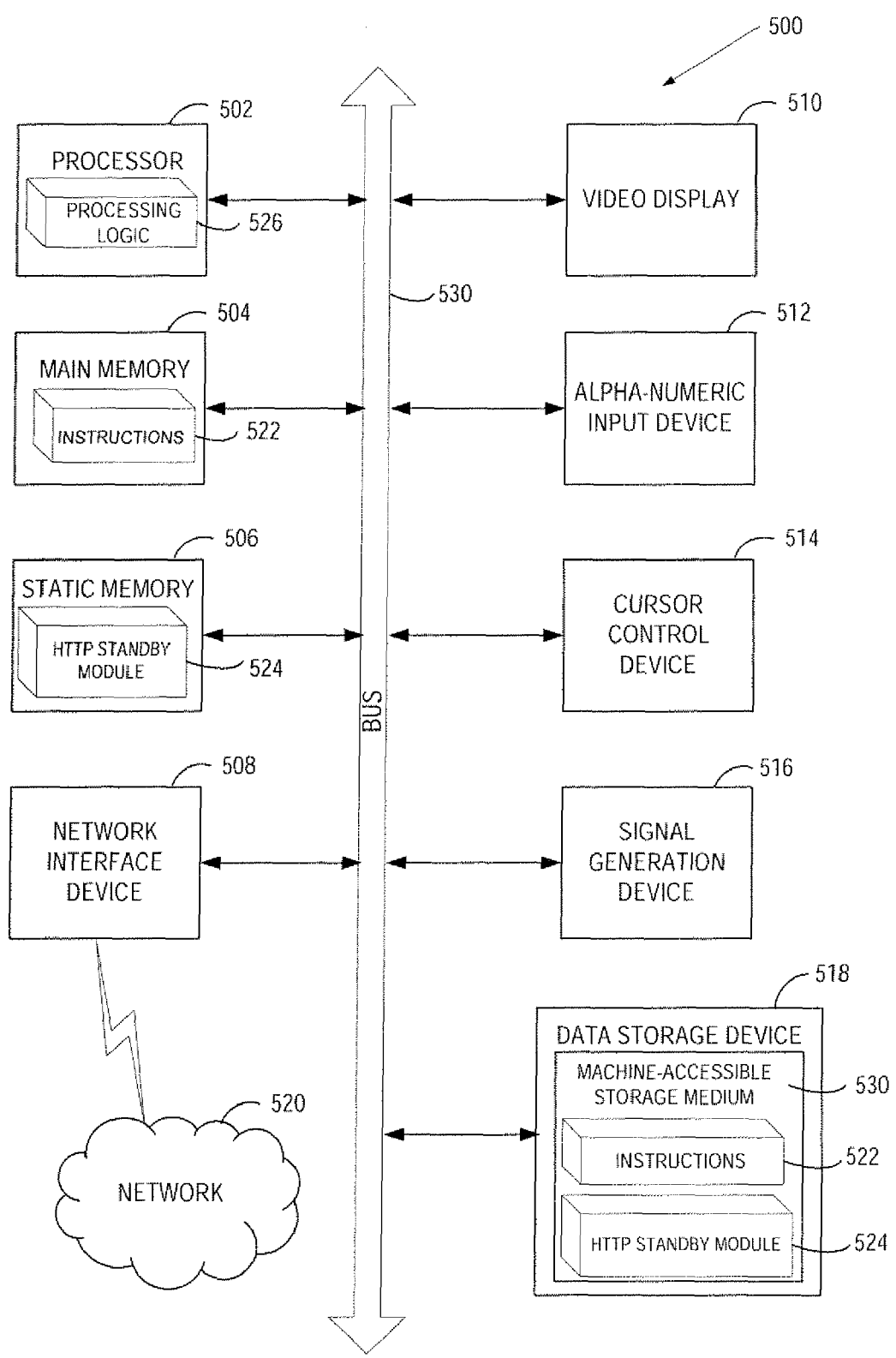
FIG. 5 is a block diagram illustrating an example of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g. read-only memory (ROM), flash memory, dynamic random access memory (DRAM) such as synchronous DRAM (SDRAM), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 530 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-accessible storage media. The software 522 may further be transmitted or received over a network 520 via the network interface device 508.

The machine-accessible storage medium 530 may also be used to store the HTTP seeking module 524 as presently described. The HTTP seeking module 524 may also be stored in other sections of computer system 500, such as static memory 506.

While the machine-accessible storage medium 530 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, implemented by a client computing system programmed to perform the following, comprising:

simultaneously opening, by the client computing system, a first HTTP connection and a second HTTP connection between a same application hosted by the client computing system with a same server;
requesting, by the client computing system, an entire random access file from the server via the first HTTP connection;
receiving and reading, by the client computing system, data from the random access file for the request via the first HTTP connection;
periodically sending, by the client computing system, a cache status request to the server via the second HTTP connection while reading the data from the random access file via the first HTTP connection;
communicating, by the client computing system, a seek request over the second HTTP connection prior to the client computing system completing the reading of data from the random access file on the first HTTP connection, wherein the seek request is for data at a location in the random access file;
closing, by the client computing system, the first HTTP connection while the client computing system is receiving data from the random access file via the first HTTP connection in response to communicating the seek request to the server over the second HTTP connection; and
receiving, by the client computing system, a response from the server to the seek request via the second HTTP connection.

2. The computer-implemented method of claim 1 further comprising:
receiving additional data from the server on the second HTTP connection; and
reading the additional data on the second HTTP connection.

3. The computer-implemented method of claim 2 further comprising:
opening a third HTTP connection with the server; and
maintaining the third HTTP connection open while reading the additional data on the second HTTP connection.

4. The computer-implemented method of claim 1 wherein communicating the seek request over the second HTTP connection comprises:
requesting a portion of the random access file.

5. The computer-implemented method of claim 1 wherein the random access file comprises an audio and video file.

6. A client computer system comprising:
a memory to store an application configured to read data from a random access file from a server;
a processing device coupled to the memory to execute the application, an HTTP standby module, executed by the processing device, the HTTP standby module comprising a HTTP standby connector and a request generator, wherein the HTTP standby connector is configured to simultaneously open a first HTTP connection and a second HTTP connection between the same application with the same server, periodically send a cache status request to the server via the second HTTP connection while the application reads data from the random access file via the first HTTP connection, communicate a seek request over the second HTTP connection prior to the processing device completing the reading of data from the random access file on the first HTTP connection, wherein the seek request is for data at a location in the random access file, close the first HTTP connection while the processing device is receiving data from the random access file via the first HTTP connection in response to communicating the seek request to the server over the second HTTP connection, and receive a response from the server to the seek request via the second HTTP connection,
wherein the request generator is configured to request the entire random access file from the server via the first HTTP connection.

7. The client computer system of claim 6 wherein the application is configured to receive and read additional data on the second HTTP connection.

8. The client computer system of claim 7 wherein the HTTP standby connector is configured to open a third HTTP connection with the server, and to maintain the third HTTP connection open while reading the additional data on the second HTTP connection.

9. The client computer system of claim 6 wherein the HTTP standby connector is configured to communicate the seek request over the second HTTP connection comprises the HTTP standby connector being configured to request a portion of the random access file.

10. The client computer system of claim 6 wherein the random access file comprises an audio and video file.

11. A non-transitory computer-accessible storage medium including data that, when accessed by a computer, cause the computer to perform a method comprising:
simultaneously opening, by the computer, a first HTTP connection and a second HTTP connection between a same application hosted by the computer with a same server;
requesting an entire random access file from the server via the first HTTP connection;
receiving and reading data from the random access file for the request via the first HTTP connection;
periodically sending a cache status request to the server via the second HTTP connection while reading the data from the random access file via the first HTTP connection;
communicating a seek request over the second HTTP connection prior to the computer completing the reading of data from the random access file on the first HTTP connection, wherein the seek request is for data at a location in the random access file;
closing the first HTTP connection while the computer is receiving data from the random access file via the first HTTP connection in response to communicating the seek request to the server over the second HTTP connection; and
receiving, by the computer, a response from the server to the seek request via the second HTTP connection.

12. The non-transitory computer-accessible storage medium of claim 11 wherein the method further comprises:
receiving additional data from the server on the second HTTP connection; and
reading the additional data on the second HTTP connection.

13. The non-transitory computer-accessible storage medium of claim 12 wherein the method further comprises:
opening a third HTTP connection with the server; and
maintaining the third HTTP connection open while reading the additional data on the second HTTP connection.

14. The non-transitory computer-accessible storage medium of claim 11 wherein communicating the seek request over the second HTTP connection comprises:
requesting a portion of the random access file.

15. The non-transitory computer-accessible storage medium of claim 11 wherein the random access file comprises an audio and video file.

* * * * *